(12) United States Patent
Ough et al.

(10) Patent No.: US 7,058,649 B2
(45) Date of Patent: Jun. 6, 2006

(54) AUTOMATED PRESENTATION LAYER CONTENT MANAGEMENT SYSTEM

(75) Inventors: Cameron J. Ough, Portland, OR (US); Joshua R. Williams, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 580 days.

(21) Appl. No.: 09/967,810

(22) Filed: Sep. 28, 2001

(65) Prior Publication Data
US 2003/0065640 A1 Apr. 3, 2003

(51) Int. Cl.
*G06F 17/30* (2006.01)

(52) U.S. Cl. .............................. 707/102; 707/9; 705/1

(58) Field of Classification Search ................ 707/102, 707/9; 705/1
See application file for complete search history.

(56) References Cited

U.S. PATENT DOCUMENTS

| | | | |
|---|---|---|---|
| 6,067,531 A * | 5/2000 | Hoyt et al. ..................... 705/35 |
| 6,085,220 A | 7/2000 | Courts et al. |
| 6,088,028 A | 7/2000 | Gipalo |
| 6,247,032 B1 * | 6/2001 | Bernardo et al. ........... 715/530 |
| 6,279,037 B1 | 8/2001 | Tams et al. |
| 6,327,620 B1 | 12/2001 | Tams et al. |
| 6,335,765 B1 | 1/2002 | Daly et al. |
| 6,345,239 B1 * | 2/2002 | Bowman-Amuah ............ 703/6 |
| 6,348,934 B1 | 2/2002 | Gipalo |
| 6,360,249 B1 | 3/2002 | Courts et al. |
| 6,400,768 B1 | 6/2002 | Nagumo et al. |
| 6,400,820 B1 | 6/2002 | Edwards et al. |
| 6,424,979 B1 * | 7/2002 | Livingston et al. ......... 715/511 |
| 6,426,944 B1 | 7/2002 | Moore |
| 6,477,145 B1 | 11/2002 | Moore |
| 6,486,897 B1 | 11/2002 | Arrouye et al. |
| 6,563,518 B1 | 5/2003 | Gipalo |
| 2001/0032105 A1 * | 10/2001 | Frye et al. ..................... 705/7 |
| 2001/0032154 A1 * | 10/2001 | Schummer .................. 705/30 |
| 2001/0034765 A1 * | 10/2001 | Bimson et al. ............. 709/205 |
| 2001/0047276 A1 * | 11/2001 | Eisenhart ....................... 705/1 |
| 2002/0032872 A1 * | 3/2002 | Jussy et al. ................. 713/201 |
| 2002/0053078 A1 * | 5/2002 | Holtz et al. .................. 725/14 |
| 2002/0136214 A1 * | 9/2002 | Do et al. ..................... 370/392 |
| 2002/0152244 A1 * | 10/2002 | Dean et al. ................. 707/530 |

* cited by examiner

*Primary Examiner*—Wayne Amsbury
(74) *Attorney, Agent, or Firm*—Blakely, Sokoloff, Taylor & Zafman LLP

(57) ABSTRACT

A system and method for delivering a file to a portal is disclosed. The invention supports a separation of content generation from presentation of content to deliver the file for presentation on a portal. By separation of content from presentation of content, a uniform presentation of a file can be rendered on the portal. The invention also supports multiple versions and renderings of the presentation at the portal level.

25 Claims, 2 Drawing Sheets

AUTOMATED PRESENTATION LAYER CONTENT MANAGEMENT SYSTEM

FIELD

The invention relates to presentation of data, and more particularly, to a workflow management system for the data presentation.

BACKGROUND DESCRIPTION

In recent years, wide area networks ("WAN") have become an important part of the many people's lives. Every day, millions of users connect to the most well known WAN, the internet. Internet services include E-Mail, database access, and news groups. The Internet also acts as a service medium for many companies trying to market products. Accordingly, WANs, such as the Internet have become a valuable resource for people in a broad range of fields including the industry, education, government and research.

In business, for example, many companies have multimedia Internet Web-sites in order to advertise, sell and maintain their products and services. Customers are often allowed to use a customer control portal (CCP) to see into and control some aspects of the services offered by a company. However, as companies are also becoming increasingly more international in business activities, the customers may be accessing the Internet internationally. Also, the contents for presentation may be created at different places.

Because management of these presentations happens at many different levels, one of the hardest things about designing a CCP is managing and maintaining the presentation of contents. For example, if the approval process for each content item and content presentation follows a different process, the resultant presentation may vary in "look and feel." Also, updates to corporate image and/or legal guidelines requires communication with and development efforts by numerous engineering teams. Accordingly, it may be very difficult, if not impossible at times, to ensure updates for all components of the CCP. Moreover, a further burden is added to localize the portal to many different languages and locales.

BRIEF DESCRIPTION OF THE DRAWINGS

The invention will be described in detail with reference to the following drawings in which like reference numerals refer to like elements wherein.

DETAILED DESCRIPTION

In the following description, numerous specific details are set forth to provide a thorough understanding of the invention. However, it will be understood by one of ordinary skill in the art that the invention may be practiced without these specific details. In other instances, well-known circuits, structures and techniques have not been shown in detail in order not to obscure the invention.

As disclosed herein, a "module" may be a software module, a hardware module, or a combination thereof. The term "file" refers to information stored on a device or an external storage medium. Example of a file includes, but is not limited to, a program, a document, a report, a database, a directory, a web page and any other collection of data. The term network"refers to a group of two or more interconnected computers. The network allows the interconnected computers to exchange information and share resources. The term portal" refers to a gateway or entrance, both on-line and offline, to a broad array of resources and services. Example of a portal includes, but is not limited to, a web site, a web page, email, a search-engine and a directory.

Also, it is noted that the invention may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Generally, the invention allows an efficient management and maintenance of files presented on a portal by separating the generation of file contents from the presentation of file contents.

Figure 1:
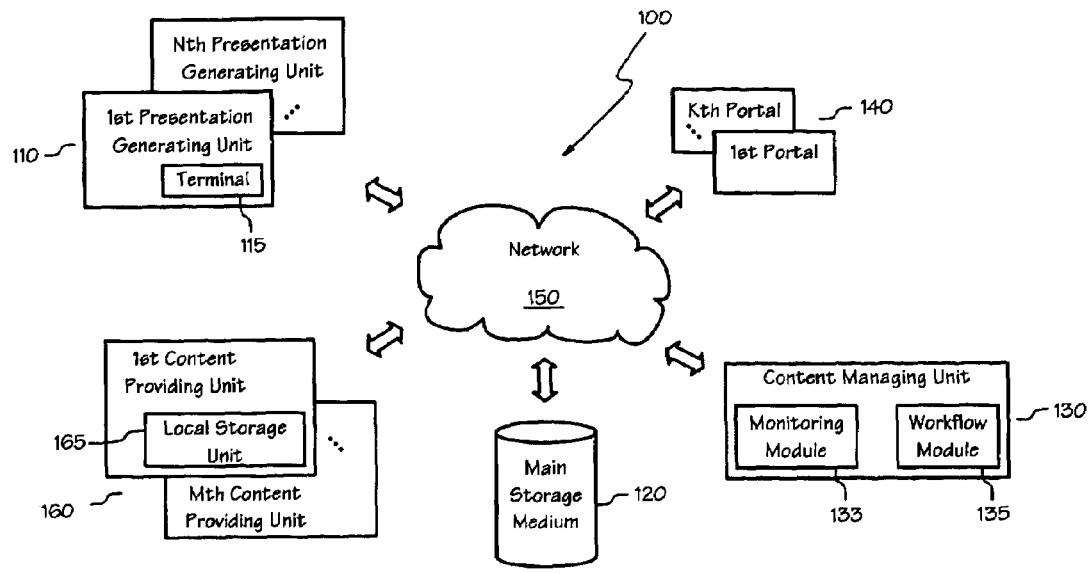
FIG. 1 is an exemplary system for delivering a file to a portal in accordance with one embodiment of the invention.

FIG. 1 shows an exemplary system 100 of delivering a file for presentation on a portal in accordance with one embodiment of the invention. The system 100 includes a plurality of n content generating units 110, a storage medium 120, a content managing unit 130 and a plurality of k portals 140 connected through a network 150. Some or all of the content generating units 110 may be at different locations from one another. Some or all of the portals 140 may be at different locations from one another. Also, some of the content generating units 110 may be at the same locations as some of the portals 140. Similarly, the storage medium 120 and the content managing unit 130 may be at the same or different location from one another, and one or both may be at a same location as some of the generating units 110 and/or portals 140.

A content generating unit 110 includes one or more content owners working together or independently to create, design, and/or provide the data in order to generate a file. Once generated, the file is input into a terminal 115 and is inserted into the storage medium 120 through the network 150. The content managing unit 130 then takes over the file from the storage medium 120 and manages the file through a workflow to integrate the file for presentation on a portal 140. The content managing unit 130 may include one or more content managers to manage, process, and/or prepare the file through the workflow for presentation on the portal 140. The content managing unit 130 may also include software, firmware and/or hardware to process the file through the workflow. In one embodiment, the content managing unit 130 includes a monitoring module 133 to detect new files inserted into the storage medium 120 and a workflow module 135 to automate the processing of the new file through the workflow.

In particular, the workflow may include one or a combination of localization of the file, internationalization of the file, and reviewing process of the file. Localization is the process of adapting the file into a specific language, culture, and/or local "look-and-feel." For example, a company may have an image, trademark and/or legal guidelines to which a presentation must adhere. This localization may be performed by the content managing unit 130 or may be sent to an outside vendor. For instance, when the monitoring module 133 detects a new file in the storage medium 120, the workflow module 135 may download the file and initiate localization. Some parts of the localization, such as language translation, may be performed automatically by programmed software and/or firmware in the workflow module 135, while other parts of localization may be performed manually by the content managers. Alternatively, the workflow module 135 may send the file to an outside vendor for partial or full localization.

Internationalization is the process of implementing the file in a format that can easily be localized. Therefore, a file is internationalized before localization. Examples of internationalization may include developing the file to support international character sets such as the Unicode and creating graphic images that can be easily translated. The internationalization may also be performed by the content manager 130 or may be sent to an outside vendor. For instance, when the monitoring module 133 detects a new file in the storage medium 120, the workflow module 135 may download the file and initiate internationalization. After internationalization of the file, the workflow module 135 initiates localization of the file as described above.

The reviewing process is a process to review and approve the contents and appearance of the file for presentation. The reviewing and approvals occur at different points in time during the workflow. For example, the file may require approvals from a legal department, a marketing department and/or the stakeholders. Some of the approval may be performed automatically by programmed software and/or firmware in the workflow module 135. Alternatively, the workflow module 135 may render and pass the file to the appropriate people at various points of the workflow. In one embodiment, the file is passed to the people using a website which may be secured. These people can then review, give feedback and/or approve the contents and/or appearance of the file.

The integration of a file for presentation on the portal 140 may vary depending upon the particular workflow. The specific workflow can be designated either by the content owners of the content generating unit 110 when inserting the file to the storage medium 120 or by the content managing unit 130 when taking over the file from the storage medium 120. In one embodiment, the content owner walks through a configuration wizard that allows building a customized workflow or choosing a pre-built workflow for the integration testing. Here, the configuration wizard refers to an interactive guide that gives a step-by-step assistance to a content owner through an unfamiliar task.

Accordingly, there is a separation in the generation of the contents for a file and the presentation of the file. From the point of view of the content generating unit 110, the workflow required for integrating contents of a file would seem automatic, after inserting the contents into the storage medium 120. In other words, the content owners of the content generating unit 110 need not only worry about integrating and presenting the contents of a file, but may concentrate on obtaining and/or analyzing data to generate additional contents for a portal.

Figure 2:
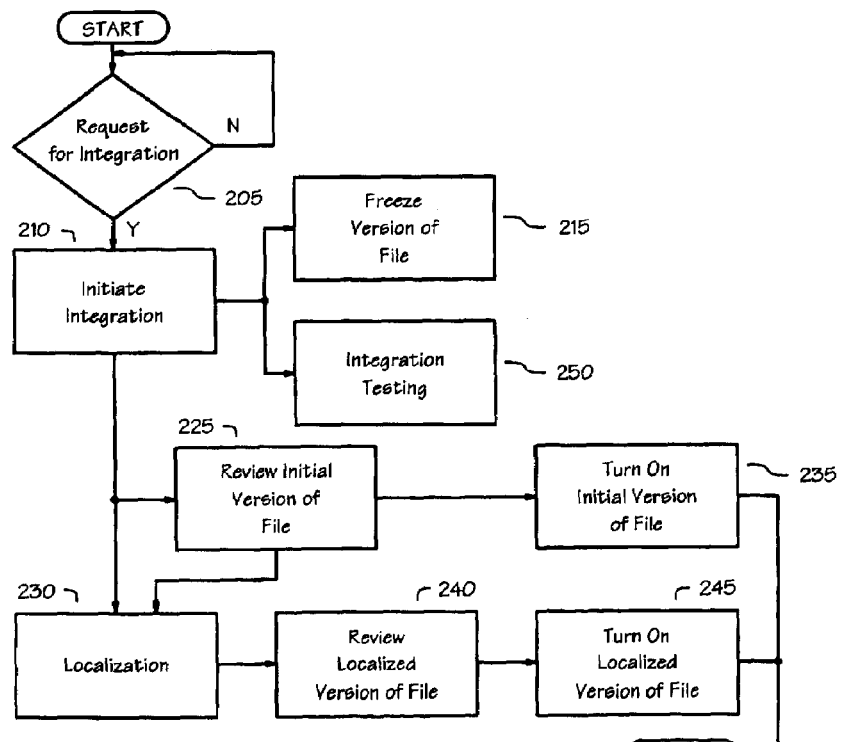
FIG. 2 shows an exemplary workflow in accordance with one embodiment of the invention.

FIG. 2 shows an exemplary workflow 200 in accordance with one embodiment of the invention. The workflow begins when content is added for presentation on the portal 140 (block 205). Content is added when the content generating unit 110 inserts contents for a new file or an updated version of an existing file into the storage medium 120. The content managing unit 130 then takes over the file and initiates the integration testing in accordance with a designated workflow (block 210). In the embodiment shown, the designated workflow includes localization and reviewing process of the file.

In particular, the content managing unit 130 freezes the version of contents added and performs integration testing on the contents added (blocks 215 and 250). When contents are "frozen," such contents cannot be accessed by an unauthorized user, such as a customer, through the portal 140. The integration testing is the process for combining the added contents to the existing contents in the storage medium 120 such that all contents can be properly presented on the portal 140.

To freeze a version of contents, metadata can be attached to each file added into storage medium 120 by the content generating unit 110, or the content managing unit 130. The metadata includes information describing the contents of the file such as the content owner, version number, the type of file, whether the file is localized and whether the file is frozen. The content managing unit 130 maintains the metadata of a file throughout the workflow. Accordingly, the content managing unit 130 may set the metadata of a file to indicate that the file is frozen. If the metadata indicates that a file is frozen, the file is not presented on the portal 140.

If the added content is a new file, the content managing unit 130 passes the initial version of the file to the appropriate people for review (blocks 220 and 225). At some point in the reviewing process of the workflow, the contents of the file are approved for localization and the content managing unit 130 begins localization of the file (block 230). As discussed above, the localization may be performed by the content managing unit 130 or sent to an outside vendor. At another point in the reviewing process of the workflow, the initial version of the file is approved for presentation and the initial version is turned on (block 235). When a file is turned on, the file is "unfrozen" and can be accessed by all through the portal 140. Here, the metadata describing whether a file is frozen may be set or unset to indicate that the file is not frozen. If the metadata indicates that a file is not frozen, the file is can be presented on the portal 140.

In one embodiment, the initial version of the file can automatically be turned on and become instantly available for access through the portal 140, upon the last approval. Also, upon localization of the file, the content managing unit 130 passes the localized version of the file to the appropriate people for review (240). When the last approval is given, the localized version of the file can automatically be turned on and become instantly available for access through the portal 140 (block 245).

If the added content is an updated version of an existing file, the content managing unit 130 begins localization of the updated version of the file (blocks 220 and 230). The localization may be performed by the content managing unit 130 or sent to an outside vendor. Upon the last approval, the localized updated version of the file can automatically be turned on and become instantly available for access through the portal 140 (blocks 240 and 245).

When a localized version becomes available, any previous versions stops being presented. Therefore, once a localized version of a new file becomes available, the localized version of the new file is presented rather than the initial version of the new file. In one embodiment, the metadata of a file can be used to control the version presented on the portal 140. While the metadata of one or more versions of a file may indicate that the version is turned on, i.e. not frozen, the file corresponding with the metadata indicating the newest version would be presented on the portal 140. Similarly, once a localized updated version of an existing file becomes available, the localized updated version is presented rather than any previous localized versions.

Also in the workflow 200, an updated version of the file is not presented until it is localized and approved for presentation. In other words, if a localized version of a file already exists, that version is presented rather than an updated version that is not yet localized. However, in other embodiments, an initial updated version may be presented rather than an existing localized version.

Figure 3:
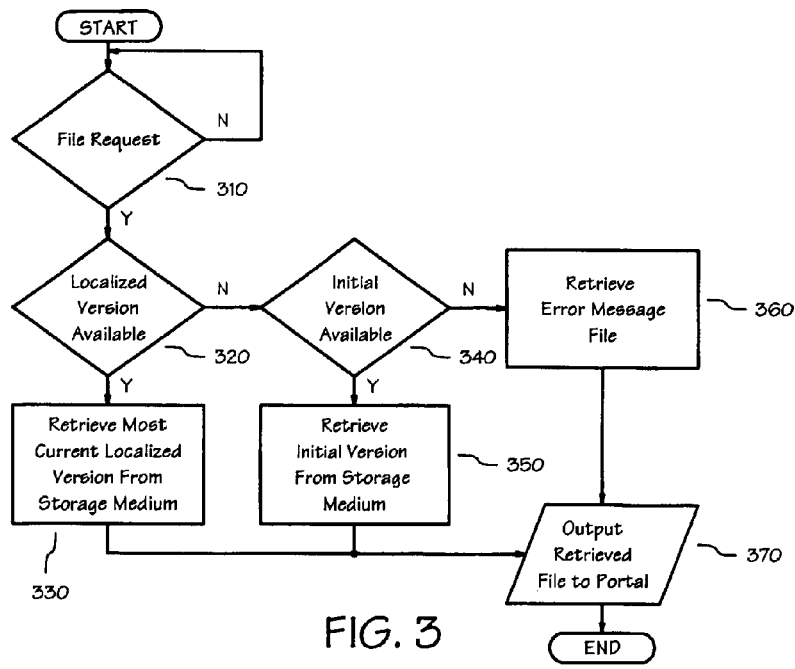
FIG. 3 shows an exemplary access to a file through a portal in accordance with one embodiment of the invention.

FIG. 3 shows an exemplary access 300 to a file in accordance with the invention. When a user requests a file (block 310), a determination is made whether a localized version is available (block 320). If a localized version is available, the most updated localized version is retrieved from the storage medium 120 and output to the portal 140 (blocks 330 and 370). Otherwise, if a localized version is not available, a determination is made whether an initial version of the requested file is available (block 340). If available, the initial version is retrieved from the storage medium 120 and output to the portal 140 (blocks 350 and 370). If neither a localized nor initial version of the requested file is available, an error message may be retrieved and output to the portal 140 (blocks 360 and 370). In another embodiment, a different message may be used or a different event may occur when neither a localized nor initial version is available.

In the above process, the metadata of files can be used to determine whether a localized version is available, whether an initial version is available, and the most current version available.

By separating the generation of content from the presentation of the content, the workflow in accordance with the invention allows for a fast and efficient way to integrate new and updated versions of files for presentation on a portal. Also, the invention can easily be implemented and applied in any existing system. One application of the invention is to build a customer control portal (CCP) of companies such that customers can see into and control some aspects of the services offered by the company.

A typical integration of the report to the CCP requires the following:

Management of the process around localizing the content presentation and providing management functionality to manage the updates to that content;

Development of the content display to meet the corporate legal, trademark, and branding guidelines for all languages and locales; and Management of a review process with the content owners/legal/marketing to ensure that the content and updates is correct.

Figure 4:
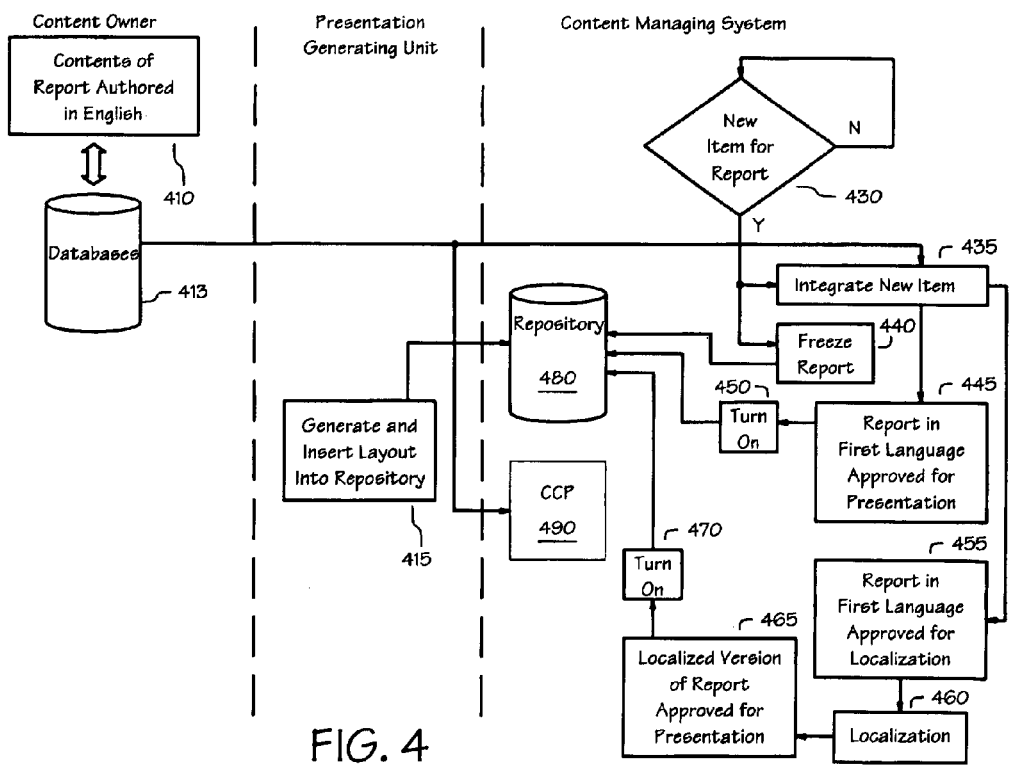
FIG. 4 shows an exemplary generation and delivery of a file to a customer control portal.

In accordance with the invention, a file such as a report can be integrated efficiently while meeting the above requirements. The invention also delivers files with a uniform "look and feel." FIG. 4 shows a delivery of a file to the CCP. For purposes of explanation, assume that a report is generated and added for integration to the CCP. Further assume that the CCP is a web portal and that the report is to be presented in both English and Japanese.

First, the report is designed. Here, thought goes into how the data should be gathered and presented to the customer. Thereafter, a report is authored and generated in a first language, for example, English (block 410). The content owner then inserts the initial report into a repository 480 (block 415). Here, the content owner can use a configuration wizard to build a workflow or choose a pre-built workflow for the content. After inserting the contents into the repository, the content owner need not further participate in the integration. Therefore, the content owner may continue to work on an update of the contents or on new contents to be added. Similarly, an update to a report may also be designed and inserted into the repository.

The repository 480 is where the content manager system (CMS) takes over the report. When a new content item, for example the report, is added to the repository 480, the CMS freezes the report and initiates integration of the report (blocks 435 and 440). As part of the integration testing, the content manager of the CMS passes the report to the appropriate people on the contents' workflow. For example, the content manager passes the report to people in the legal department, the marketing department, and the stakeholders of the company. These people are allowed access to a CMS website to give feedback and approve the contents.

At some point in the workflow, for example when an approval for presentation is received, the report in English is automatically turned on and instantly begins being available to people logging into the connected CCP (blocks 445 and 450). Also, at some point in the workflow, for example when approval for localization is received, the contents are approved enough to send off for localization (blocks 455 and 460). Here, the CMS renders an English copy of the content and may send it to a localization vendor with a English version of the presentation along with instructions about which languages to localize it to.

When a localized content comes back from the vendor, a localized content approval workflow is then initiated and the localized content reaches different people (block 465). As the presentation has already been approved, the people need just approve the translation. Upon the last approval, the localized presentations are turned on (block 470) and instantly users of the CCP who have their language set to that locale will stop seeing either a older version of the localized content or the English version, if this is the first version of the content item to go live, and instead see the newly localized and approved latest version of the report on a CCP 490.

In the workflow above, the CMS may maintain the versions of a file using metadata such as the Extensible Markup Language (XML) and an Extensible Stylesheet Language (XSL). XML is a programming language that allows web developers to create customized tags to organize and deliver content more efficiently. XSL is a language for creating a style sheet that describes how data sent over the web using the XML is to be presented to a user.

Accordingly, the invention supports multiple versions and renderings of that presentation at the portal level to be applied to data before it goes downstream to the customer. The CMS will put into place a system where an independent approval workflow can be defined for each piece of content that is added to the CCP. In this way, a company can ensure that the right people have approved what the company is putting out to the customers while also ensuring that the customers receive the most up-to-date versions of the content created for them. In addition, by putting translation and translation approval into the workflow, the need for content generators to worry about the localization process is eliminated, thereby allowing the content generators to work on other projects.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A system comprising:
a storage medium;
a content generating unit to add a file to the storage medium;
a content managing unit to
detect the addition of the file to the storage medium,
freeze the added file to permit access only by authorized users,
perform integration testing of the added file,
unfreeze the added file when the added file is approved for access by any user, such that any user can access the added file,
perform localization of the added file to create a localized file when the added file is approved for localization,
add the localized file to the storage medium,
freeze the localized file to permit access only by authorized users,
perform a review of the localized file, and
unfreeze the localized file when the localized file is approved for access by any user, such that any user can access the localized file and can not access the added file.

2. The system of claim 1, wherein integration testing includes at least one of a legal approval process, a stakeholder approval process, and a marketing approval process.

3. The system of claim 1, wherein access by any user is through a portal connected to a network.

4. The system of claim 1, wherein the content managing unit is further to perform internationalization of the added file to create an internationalized file, and localization of the added file is performed on the internationalized file.

5. The system of claim 4, wherein internationalization of the added file includes developing the file to support international character sets.

6. The system of claim 1, further comprising a content providing unit to
provide the localized file for access by any user if the localized file is not frozen,
provide a most current localized file for access by any user if the localized file is frozen,
provide the added file for access by any user if the localized file is frozen and there is no most current localized file, and
provide an error message for access by any user if the localized file and the added file are frozen and there is no most current localized file.

7. The system of claim 1, further comprising a content providing unit to
provide the localized file for access by any user if the localized file is not frozen,
provide the added file for access by any user if the localized file is frozen or the localized file has not been created, and
provide an error message for access by any user if the added file is frozen and either the localized file is frozen or the localized file has not been created.

8. The system of claim 1, wherein one of the content generating unit and the content managing unit is further to attach metadata to the added file, the metadata including a version number, whether the file is localized, and whether the file is frozen.

9. The system of claim 1, wherein a plurality of approvals are required for the added file to be approved for access by any user.

10. A method comprising:
detecting the addition of a file to a storage medium;
freezing the added file to permit access only by authorized users;
performing integration testing of the added file;
unfreezing the added file when the added file is approved for access by any user, such that any user can access the added file;
performing localization of the added file to create a localized file when the added file is approved for localization;
adding the localized file to the storage medium;
freezing the localized file to permit access only by authorized users;
performing a review of the localized file; and
unfreezing the localized file when the localized file is approved for access by any user, such that any user can access the localized file and can not access the added file.

11. The method of claim 10, wherein performing integration testing includes obtaining at least one of a legal approval, a stakeholder approval, and a marketing approval.

12. The method of claim 10, wherein access by any user is through a portal connected to a network.

13. The method of claim 10, further comprising performing internationalization of the added file to create an internationalized file, and performing localization of the added file is performed on the internationalized file.

14. The method of claim 13, wherein performing internationalization of the added file includes developing the file to support international character sets.

15. The method of claim 10, further comprising:
providing the localized file for access by any user if the localized file is not frozen;
providing a most current localized file for access by any user if the localized file is frozen;
providing the added file for access by any user if the localized file is frozen and there is no most current localized file; and
providing an error message for access by any user if the localized file and the added file are frozen and there is no most current localized file.

16. The method of claim 10, further comprising a content providing unit to:
providing the localized file for access by any user if the localized file is not frozen;
providing the added file for access by any user if the localized file is frozen or the localized file has not been created; and
providing an error message for access by any user if the added file is frozen and either the localized file is frozen or the localized file has not been created.

17. The method of claim 10, further comprising attaching metadata to the added file, the metadata including a version number, whether the file is localized, and whether the file is frozen.

18. The method of claim 10, wherein a plurality of approvals are required for the added file to be approved for access by any user.

19. A content managing unit comprising:
a monitoring module to detect the addition of a file to a storage medium; and
a workflow module to freeze the added file to permit access only by authorized users, perform integration testing of the added file, unfreeze the added file when the added file is approved for access by any user, such that any user may access the added file, perform localization of the added file to create a localized file when the added file is approved for localization, add the localized file to the storage medium, freeze the localized file to permit access only by authorized users, perform a review of the localized file, and unfreeze the localized file when the localized file is approved for access by any user, such that any user may access the localized file and may not access the added file.

20. The content managing unit of claim 19, wherein integration testing includes at least one of a legal approval process, a stakeholder approval process, and a marketing approval process.

21. The content managing unit of claim 19, wherein access by any user is through a portal connected to a network.

22. The content managing unit of claim 19, wherein the workflow module is further to perform internationalization of the added file to create an internationalized file, and localization of the added file is performed on the internationalized file.

23. The content managing unit of claim 22, wherein internationalization of the added file includes developing the file to support international character sets.

24. The content managing unit of claim 19, wherein the workflow module is further to attach metadata to the added file, the metadata including a version number, whether the file is localized, and whether the file is frozen.

25. The content managing unit of claim 19, wherein a plurality of approvals are required for the added file to be approved for access by any user.

* * * * *